(12) United States Patent
Zhang et al.

(10) Patent No.: US 11,719,838 B2
(45) Date of Patent: Aug. 8, 2023

(54) ARRAY-TYPE UNDERWATER APPARATUS AND METHOD FOR MONITORING DEFORMATION OF RESERVOIR LANDSLIDE

(71) Applicant: CHINA UNIVERSITY OF GEOSCIENCES (WUHAN), Wuhan (CN)

(72) Inventors: Junrong Zhang, Wuhan (CN); Huiming Tang, Wuhan (CN); Yongquan Zhang, Wuhan (CN); Chengyuan Lin, Wuhan (CN); Dwayne Tannant, Kelowna (CA); Changdong Li, Wuhan (CN); Tao Wen, Wuhan (CN); Bocheng Zhang, Wuhan (CN); Sixuan Sun, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 153 days.

(21) Appl. No.: 17/338,657

(22) Filed: Jun. 3, 2021

(65) Prior Publication Data

US 2022/0334278 A1 Oct. 20, 2022

(30) Foreign Application Priority Data

Apr. 15, 2021 (CN) .......................... 202110407620.7

(51) Int. Cl.
| | | |
|---|---|---|
| *G01C 13/00* | (2006.01) | |
| *G01V 1/00* | (2006.01) | |
| *G01K 13/02* | (2021.01) | |
| *G01D 21/02* | (2006.01) | |
| *G01F 23/76* | (2006.01) | |

(52) U.S. Cl.
CPC ............ *G01V 1/008* (2013.01); *G01C 13/004* (2013.01); *G01D 21/02* (2013.01); *G01F 23/76* (2013.01); *G01K 13/026* (2021.01)

(58) Field of Classification Search
CPC ........ G01V 1/008; G01D 21/02; G01F 23/76; G01K 13/026; G01C 13/004; G01C 5/00
USPC .............. 73/322.5, 86, 865.8, 432.1; 33/1 H, 33/1 BB, 700, 701, 732, 754, 501.02, 33/501.03, 624, 625; 377/17, 18, 19, 24
See application file for complete search history.

(56) References Cited

U.S. PATENT DOCUMENTS

| | | |
|---|---|---|
| 8,150,669 B2 | 4/2012 | Cacas et al. |
| 10,151,851 B2 | 12/2018 | Schmidt et al. |
| 10,887,743 B2 | 1/2021 | Akyildiz et al. |

*Primary Examiner* — Robert R Raevis
(74) *Attorney, Agent, or Firm* — True Shepherd LLC; Andrew C. Cheng

(57) ABSTRACT

In an array-type underwater apparatus for monitoring deformation of a reservoir landslide, an anchor is buried at an underwater monitoring point in a landslide mass, and a floating shell is configured to float on a water surface. A GPS sensor is configured to transmit and receive a GPS signal to obtain a real-time position of the floating shell, a water temperature sensor is used to obtain a water temperature-time relationship, and a gravity wave gauge is used to obtain a wave height-time relationship. An upper end of a pull cord is securely connected to the floating shell via a displacement compensation mechanism, and a lower end of the pull cord is securely connected to the anchor. The displacement compensation mechanism compensates for a displacement after the floating shell floats with a wave. An encoder-type displacement meter measures a real-time distance between the encoder-type displacement meter and the anchor.

10 Claims, 4 Drawing Sheets

ARRAY-TYPE UNDERWATER APPARATUS AND METHOD FOR MONITORING DEFORMATION OF RESERVOIR LANDSLIDE

CROSS-REFERENCE TO RELATED APPLICATIONS

This application claims priority to Chinese Patent Application No. 202110407620.7 with a filing date of Apr. 15, 2021. The content of the aforementioned application, including any intervening amendments thereto, is incorporated herein by reference.

TECHNICAL FIELD

The present disclosure relates to the technical field of monitoring of underwater front-edge deformation of reservoir landslides, and in particular, to an array-type underwater apparatus and method for monitoring deformation of a reservoir landslide.

BACKGROUND

A landslide is a serious geological disaster in the world. With the construction of the Three Gorges project, an increasing number of ancient landslides are revived under influence of a reservoir water level, posing a certain threat to the safety of people's lives and property in the reservoir region. In a reservoir landslide, after a front-edge part of a landslide mass is immersed in water, physical and mechanical properties of the landslide mass are changed. The cohesive force and the internal friction angle are decreased, with a decreasing trend positively related to a water depth. Fluctuation of the reservoir water level causes a material loss in the front-edge part of the landslide mass. As a result, the front-edge part becomes increasingly loose and fragile, and is easier to deform than a part above the water. In addition, for some landslides that have been reinforced or treated through water drainage, front-edge parts may also be locally collapsed (for example, the Shiliushubao landslide). Based on monitoring of these characteristics, stability of the landslide can be determined earlier.

At present, frequently-used landslide displacement monitoring technologies include a surface-specific global positioning system (GPS) technology, a TDR technology, an embedded fiber layout technology, a borehole incline-measure technology, and the like. These traditional monitoring technologies are limitedly applied, and cannot be applied to underwater deformation monitoring. These traditional monitoring technologies face the following challenges in underwater monitoring: 1. waterproofing processing; 2. continuous monitoring; 3. monitoring precision. At present, a sonar measurement method (CN 202010610338.4) is usually used in underwater measurement. Due to difficulties in precise positioning by a measurement instrument on a water surface, a large error of the sonar measurement method, and other factors, the sonar measurement method cannot meet monitoring requirements of landslide deformation. The extensometer-based underwater monitoring method used by China Institute of Geo-Environment Monitoring in a Shuping landslide has a desired effect, but the implementation technology is old and easy to be affected by currents and surges.

Therefore, in view of deformation characteristics of the front edge of the reservoir landslide and limitations on a monitoring environment, a high-reliability and low-cost underwater monitoring technology for deformation of the front edge of the reservoir landslide is developed. The technology is of great significance for medium and long-term prediction and deformation monitoring at the end of a creeping stage in the reservoir landslide.

SUMMARY

In view of this, to resolve the above problem, embodiments of the present disclosure provide an array-type underwater apparatus and method for monitoring deformation of a reservoir landslide.

An embodiment of the present disclosure provides an array-type underwater apparatus for monitoring deformation of a reservoir landslide, including at least one buoy-type monitor, where the buoy-type monitor includes a floating shell, a data monitoring system, and an anchor, the anchor is buried at an underwater monitoring point in a landslide mass, the floating shell is hollowed-out for floating on a water surface, and the data monitoring system includes a pull cord, a displacement compensation mechanism, and a GPS sensor, a water temperature sensor, a gravity wave gauge, an encoder-type displacement meter, and an integrated circuit that are secured in the floating shell;

the GPS sensor is configured to transmit and receive a GPS signal to obtain a real-time position of the floating shell, the water temperature sensor is located below the water surface to monitor a change of water temperature in real time and obtain a water temperature-time relationship, and the gravity wave gauge can obtain, after the floating shell floats with a wave, wave height information calculated by a built-in accelerometer, to obtain a wave height-time relationship;

an upper end of the pull cord is securely connected to the floating shell via the displacement compensation mechanism, and a lower end of the pull cord is securely connected to the anchor, the displacement compensation mechanism is configured to compensate for a displacement after the floating shell floats with the wave, so that the pull cord is always in a tensioned state, and the encoder-type displacement meter is located below the GPS sensor, and configured to measure a real-time distance between the encoder-type displacement meter and the anchor; and the integrated circuit is electrically connected to the GPS sensor, the water temperature sensor, the gravity wave gauge, and the encoder-type displacement meter, and configured to collect, process, and transmit monitoring data.

Further, the displacement compensation mechanism includes a winding hub and a shrinking spring; the winding hub extends horizontally and can be axially and rotatably installed below the GPS sensor in the floating shell; the shrinking spring is disposed in a periphery of the winding hub, an inner end of the shrinking spring is securely connected to the winding hub, and an outer end of the shrinking spring is securely connected to the floating shell; and the upper end of the pull cord runs through the floating shell and is wound on the winding hub.

Further, the encoder-type displacement meter includes a magnetic inductive read head and a permanent magnetic encoding disk, the permanent magnetic encoding disk is coaxially secured on the winding hub, the winding hub rotates to drive the permanent magnetic encoding disk to rotate, the magnetic inductive read head is located above the permanent magnetic encoding disk, a side surface at which the magnetic inductive read head is installed is in a same plane as or parallel with a side surface of the permanent magnetic encoding disk, and the magnetic inductive read head is configured to obtain a rotation distance of the permanent magnetic encoding disk, to obtain a retracted or released length of the pull cord.

Further, the apparatus includes a ground data base station, where the ground data base station is secured on the landslide mass and located above the water surface, a data transceiver device is secured in the floating shell, the data transceiver device is located above the water surface, and is electrically connected to the integrated circuit to obtain the monitoring data, the data transceiver device is in communication connection with the ground data base station to transmit the monitoring data to the ground data base station, and the ground data base station uploads the collected monitoring data to a network.

Further, the ground data base station is provided with a solar panel.

Further, the floating shell is made of a lightweight and high-strength material.

Further, the floating shell is in a water drop shape.

Further, the apparatus includes a storage battery, where the storage battery is secured in the floating shell to supply power to the components in the buoy-type monitor.

Further, the apparatus includes a solar panel, where the solar panel is secured in the floating shell and located above the GPS sensor, a cover part of the floating shell corresponding to the solar panel are transparent, and the storage battery is electrically connected to the solar panel.

An embodiment of the present disclosure further provides a monitoring method. The above array-type underwater apparatus for monitoring deformation of a reservoir landslide is used, and the monitoring method includes the following steps:

S1: determining a specific distribution range of an underwater part of a landslide mass of a reservoir landslide based on previous exploration, determining a position of an underwater monitoring point, and disposing a plurality of buoy-type monitors as an array at the underwater monitoring point;

S2: determining real-time three-dimensional (3D) coordinate information of a floating shell via a GPS sensor, obtaining an extension length of a pull cord via an encoder-type displacement meter, and obtaining real-time 3D coordinate information of the underwater monitoring point based on a vertical distance between the GPS sensor and the encoder-type displacement meter and a vertical distance between the encoder-type displacement meter and an anchor to obtain a deformation displacement-time relationship of the underwater monitoring point;

S3: monitoring a water temperature-time relationship and a wave height-time relationship in a reservoir region via a water temperature sensor and a gravity wave gauge in real time respectively, and obtaining a reservoir water level-time relationship of the landslide via the GPS sensor; and S4: monitoring a deformation displacement, water temperature, a water level, and a wave height of the underwater monitoring point, to monitor a deformation and fracture process of an underwater side slope in real time.

The technical solutions provided in the embodiments of the present disclosure have the following beneficial effects: The buoy-type monitor monitors the real-time 3D coordinates of the underwater monitoring point, to precisely determine a coordinate change of underwater 3D space of the landslide mass for landslide monitoring and warning, optimization of a landslide prediction algorithm, and the like. In addition, relevant environmental factors (such as a change of the reservoir water level, a surge, and a water temperature) can be recorded in real time, and real-time information collection, storage, processing, analysis, and transmission functions are integrated. The solar energy—based power generation and energy storage apparatus supplies power automatically and intelligently.

Figure 1:
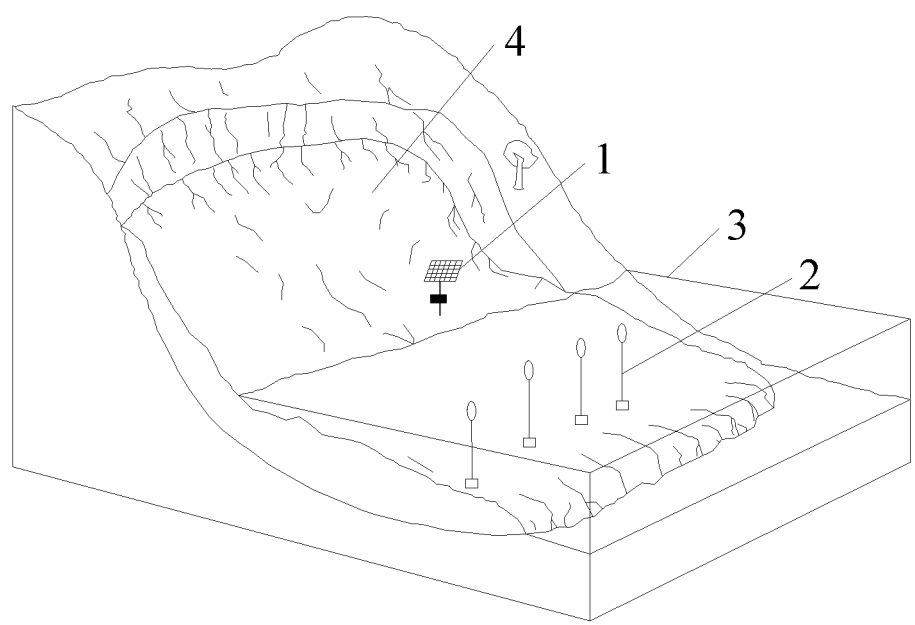
FIG. 1 is a schematic structural diagram of an embodiment of an array-type underwater apparatus for monitoring deformation of a reservoir landslide according to the present disclosure.
Figure 2:
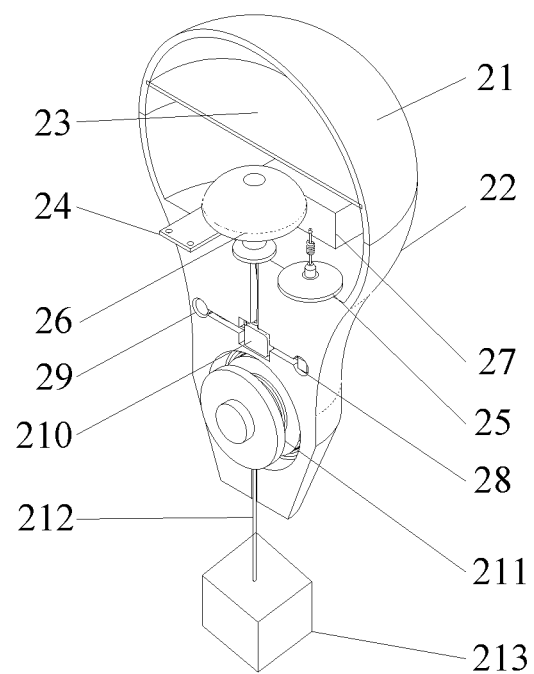
FIG. 2 is a schematic diagram of an internal structure of a buoy-type monitor in FIG. 1.
Figure 3:
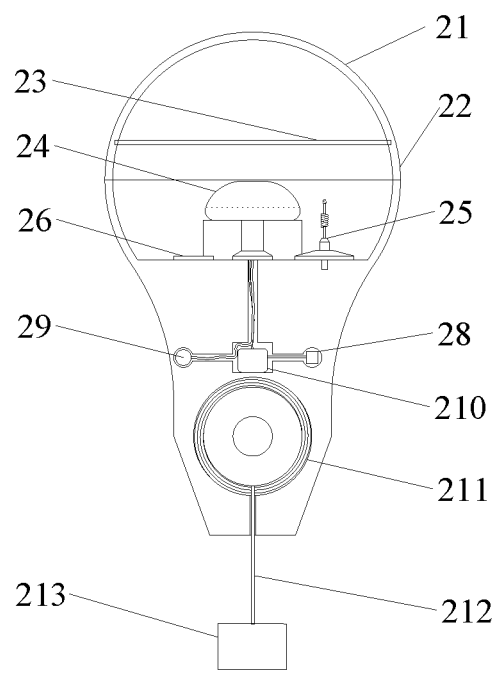
FIG. 3 is a sectional view of a buoy-type monitor in FIG. 1.
Figure 4:
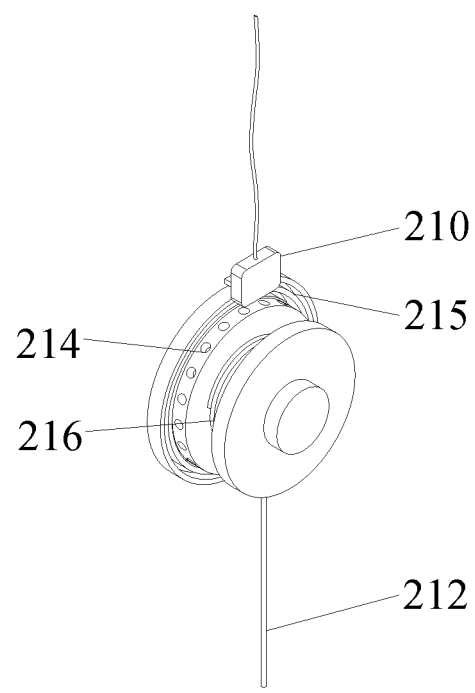
FIG. 4 is a schematic structural diagram of an encoder-type displacement meter in FIG. 1.
Figure 5:
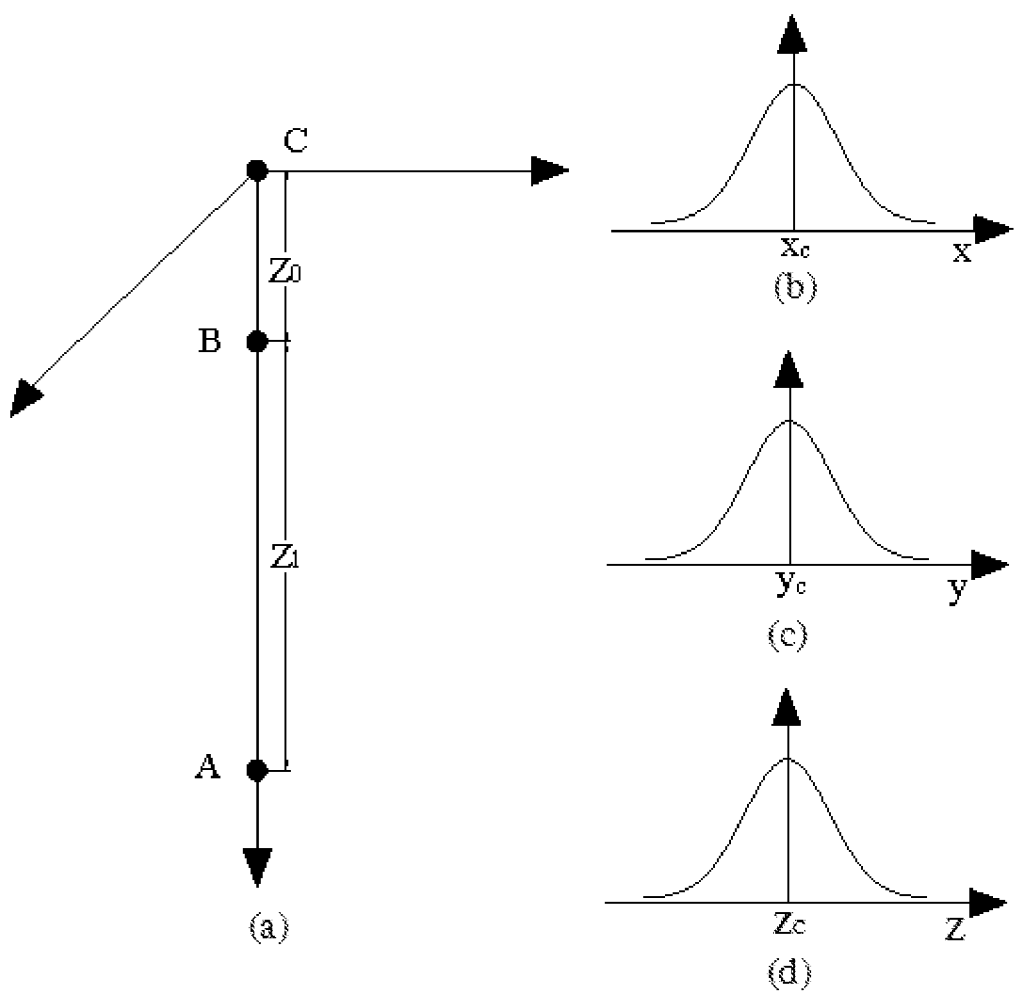
FIG. 5 is a schematic diagram showing a monitoring principle of a monitoring method.

Reference numerals: 1: ground data base station; 2: buoy-type monitor; 21: transparent top cover; 22: floating shell; 23: solar panel; 24: integrated circuit; 25: data transceiver device; 26: GPS sensor; 27: storage battery; 28: water temperature sensor; 29: gravity wave gauge; 210: magnetic inductive read head; 211: encoder-type displacement meter; 212: pull cord; 213: anchor; 214: permanent magnetic encoding disk; 215: shrinking spring; 216: winding hub; 3: water surface; and 4: landslide mass.

DETAILED DESCRIPTION

In order to make the objectives, technical solutions, and advantages of the present disclosure clearer, the implementations of the present disclosure are described in more detail below with reference to the accompanying drawings.

Refer to FIG. 1 to FIG. 5. An embodiment of the present disclosure provides an array-type underwater apparatus for monitoring deformation of a reservoir landslide, including at least one buoy-type monitor 2 and a ground data base station 1. The buoy-type monitor 2 includes a floating shell 22, a data monitoring system, and an anchor 213. The anchor 213 is buried at an underwater monitoring point in a landslide mass 4, and is secured on a surface of the underwater monitoring point via an anchor rod or in another manner. The floating shell 22 is hollowed-out for floating on a water surface 3. The data monitoring system includes a pull cord 212, a displacement compensation mechanism, and a solar panel 23, an integrated circuit 24, a data transceiver device 25, a GPS sensor 26, a storage battery 27, a water temperature sensor 28, a gravity wave gauge 29, and an encoder-type displacement meter 211 that are secured in the floating shell 22.

The GPS sensor 26 is configured to transmit and receive a GPS signal to obtain a real-time position of the floating shell 22. The water temperature sensor 28 is located below the water surface 3 to monitor a change of water temperature in real time and obtain a water temperature-time relationship. The gravity wave gauge 29 can calculate, after the floating shell 22 floats with a wave, wave height information via a built-in accelerometer, to obtain a wave height-time relationship 3. For each type of sensor, more than two sensors may be disposed in the floating shell 22, and another type of sensor may be added based on monitoring needs.

An upper end of the pull cord 212 is securely connected to the floating shell 22 via the displacement compensation mechanism, and a lower end of the pull cord 212 is securely connected to the anchor 213. The displacement compensation mechanism is configured to compensate for a displacement after the floating shell 22 floats with the wave, so that the pull cord 212 is always in a tensioned state. The encoder-type displacement meter 211 is located below the GPS sensor 26 to measure a real-time distance between the encoder-type displacement meter 211 and the anchor 213. The integrated circuit 24 includes a single chip microcomputer, and is electrically connected to the GPS sensor 26, the water temperature sensor 28, the gravity wave gauge 29, and the encoder-type displacement meter 211 to collect, process, and transmit monitoring data.

The displacement compensation mechanism may be a retractable spring that is retractable up and down. In this embodiment, the displacement compensation mechanism includes a winding hub 216 and a shrinking spring 215. The winding hub 216 extends horizontally and can be axially and rotatably installed below the GPS sensor 26 in the floating shell 22. The shrinking spring 215 is disposed in a periphery of the winding hub 216, an inner end of the shrinking spring 215 is securely connected to the winding hub 216, and an outer end of the shrinking spring 215 is securely connected to the floating shell 22. The upper end of the pull cord 212 runs through the floating shell 22 and is wound on the winding hub 216. When the floating shell 22 floats with the wave, a distance between the floating shell 22 and the anchor 213 changes. This drives the shrinking spring 215 to rotate, and the shrinking spring 215 deforms, thereby driving the winding hub 216 to rotate. In this way, the pull cord 212 is released from the winding hub 216, and a length of the pull cord 212 is increased, to compensate for a displacement between the floating shell 22 and the anchor 213 to prevent the anchor 213 from being separated from the landslide mass 4. When the distance between the floating shell 22 and the anchor 213 is decreased, the shrinking spring 215 can rotate reversely to wind the pull cord 212 on the winding hub 216, to reduce a released length of the pull cord 212 and enable the pull cord 212 to be always in the tensioned state.

The encoder-type displacement meter 211 may be a rotary photoelectric encoder. In this embodiment, the encoder-type displacement meter 211 is a magnetic inductive encoder, and includes a magnetic inductive read head 210 and a permanent magnetic encoding disk 214. The permanent magnetic encoding disk 214 is coaxially secured on the winding hub 216, and the winding hub 216 rotates to drive the permanent magnetic encoding disk 214 to rotate. The magnetic inductive read head 210 is located above the permanent magnetic encoding disk 214, and a side surface at which the magnetic inductive read head 210 is installed is in a same plane as or parallel with a side surface of the permanent magnetic encoding disk 214. The winding hub 216 is configured to carry the retracted pull cord 212, and the permanent magnetic encoding disk 214 rotates together with the winding hub 216. The magnetic inductive read head 210 is configured to obtain a rotation distance of the permanent magnetic encoding disk 214, to obtain a retracted or released length of the pull cord 212.

The ground data base station 1 is secured on the landslide mass 4 and located above the water surface 3. The data transceiver device 25 is secured in the floating shell 22 and located above the water surface 3. The data transceiver device 25 is in a same plane as the GPS sensor 26, and is electrically connected to the integrated circuit 24 to obtain the monitoring data. The data transceiver device 25 may be a GPRS module or a Zigbee module. The data transceiver device 25 is in communication connection with the ground data base station 1 to transmit the monitoring data to the ground data base station 1 or receive an instruction. The ground data base station 1 uploads the collected monitoring data to a network. The ground data base station 1 is provided with the solar panel that supplies power to the ground data base station 1.

The floating shell 22 is made of a lightweight and high-strength material, and has certain durability. The floating shell 22 is in a shape of a water drop or a ball, or in another shape that can maintain a floating and stable state. A size of the floating shell 22 determines a size of buoyancy applied to the buoy-type monitor 2. The buoyancy applied to the buoy-type monitor 2 is controlled by controlling the shape and the size of the floating shell 22 of the buoy-type monitor 2. In this way, with reference to gravity of the entire apparatus, the data transceiver device 25 is located above the water surface 3, and the water temperature sensor 28 and the gravity wave gauge 29 are located below the water surface 3.

The storage battery 27 is secured in the floating shell 22, and is electrically connected to the components in the buoy-type monitor 2 to supply power. The solar panel 23 is secured in the floating shell 22 and located above the GPS sensor 26. A cover part of the floating shell 22 corresponding to the solar panel 23 are transparent to form a transparent top cover 21 to facilitate sunlight penetration. The storage battery 27 is electrically connected to the solar panel 23 to convert solar energy into electric energy and store the electric energy in the storage battery 27.

Refer to FIG. 5a. When the water surface 3 is calm, the buoy-type monitor 2 can be regarded as a mass point C. Spatial coordinates (Xc, Yc, Zc) of the GPS sensor 26 in the buoy-type monitor 2 can be obtained via the GPS sensor 26. If a distance between the GPS sensor 26 and the winding hub 216 (point B) is $Z_0$, and a distance $Z_1$ between the winding hub 216 and the anchor 213 (point A) buried at the underwater monitoring point is the length of the pull cord 212, spatial coordinates of the underwater monitoring point are (Xc, Yc, Zc-$Z_0$-$Z_1$). Through long-term monitoring, based on spatial coordinates of each point at each time point, a cumulative displacement time series of the underwater monitoring point can be obtained.

It should be noted that when a surge is generated on the water surface 3 under the action of a passing ship or wind, due to an anchoring effect of the anchor 213, the buoy-type monitor 2 can be regarded as that the mass point C moves on the water surface 3 directly above the underwater monitoring point, and the movement will fluctuate around the coordinates (Xc, Yc, Zc) of the mass point C in a steady state (no wind wave) in x, y and Z directions of the water surface 3. For example, FIG. 5b shows a distribution probability curve of an x-axis coordinate of the buoy-type monitor 2 during x-axis movement of the buoy-type monitor 2, FIG. 5c shows a distribution probability curve of a y-axis coordinate of the buoy-type monitor 2 during y-axis movement of the buoy-type monitor 2, and FIG. 5d shows a distribution probability curve of a z-axis coordinate of the buoy-type monitor 2 during z-axis movement of the buoy-type monitor 2. A position distribution probability of the buoy-type monitor 2 conforms to normal distribution. In a fluctuation process of the buoy-type monitor 2, coordinates of a position with a highest occurrence probability are (Xc, Yc, Zc). In this case, based on the monitored coordinates of the position with the highest occurrence probability, the spatial coordinates of the underwater monitoring point can be calculated, namely, (Xc, Yc, Zc-$Z_0$-$Z_1$). Through real-time trajectory monitoring by the buoy-type monitor 2, spatial position data of the underwater monitoring point can also be obtained under a surge condition, and then the cumulative displacement time series of the underwater monitoring point can be obtained.

Figure 6:
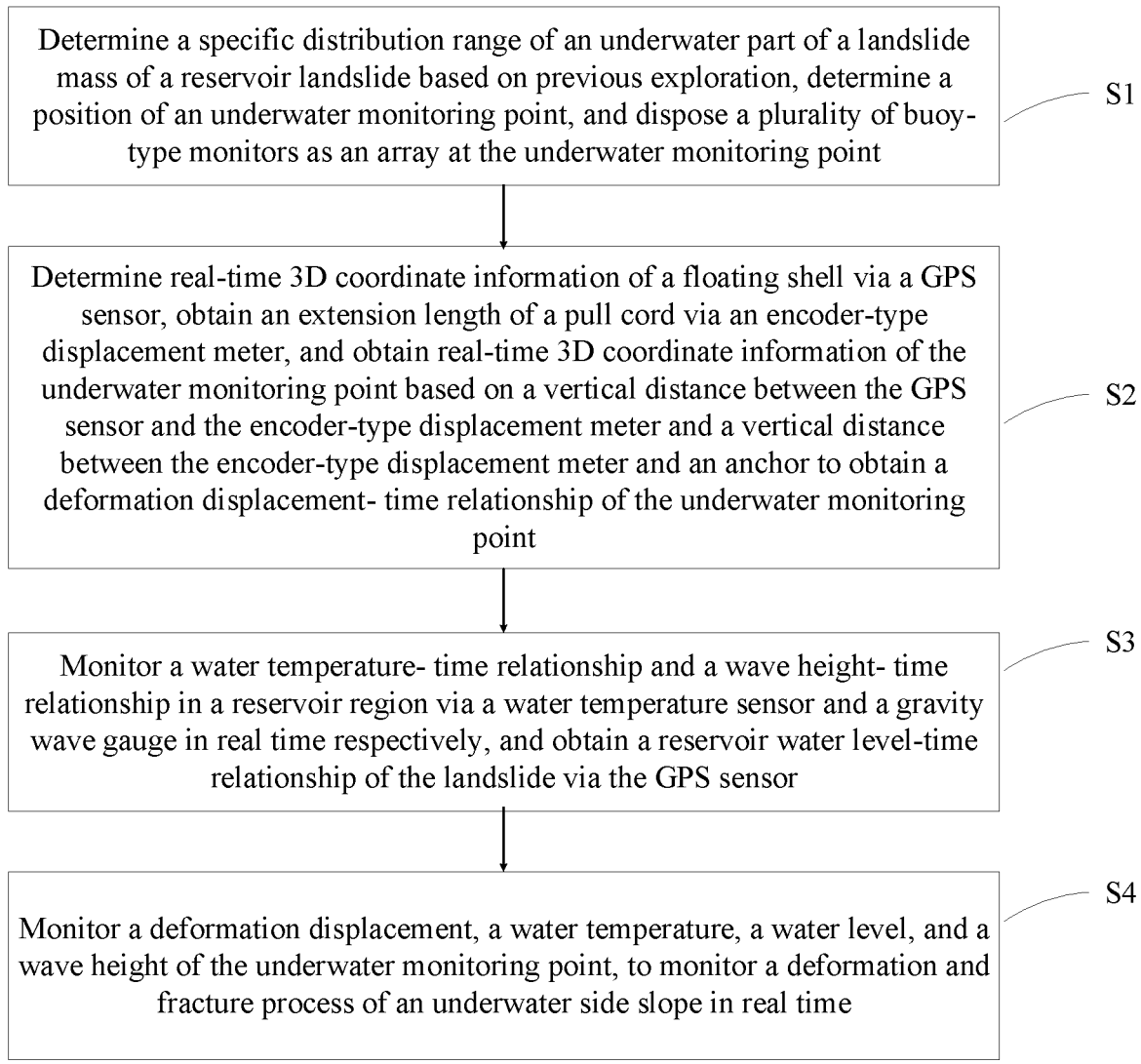
FIG. 6 is a schematic flowchart of an embodiment of a monitoring method according to the present disclosure.

Refer to FIG. 6. An embodiment the present disclosure further provides a monitoring method. The above array-type underwater apparatus for monitoring deformation of a reservoir landslide is used, and the monitoring method includes the following steps:

S1: Determine a specific distribution range of an underwater part of a landslide mass 4 of a reservoir landslide based on previous exploration, determine a position of an underwater monitoring point, and dispose a plurality of buoy-type monitors 2 as an array at the underwater monitoring point, where the underwater monitoring point should also be below a water surface 3 in a dry season, and a quantity and disposing density of the buoy-type monitors 2 are specifically determined based on a landslide volume and area.

S2: Determine real-time 3D coordinate information of a floating shell 22 via a GPS sensor 26, obtain an extension length of a pull cord 212 via an encoder-type displacement meter 211, and obtain real-time 3D coordinate information of the underwater monitoring point based on a vertical distance between the GPS sensor 26 and the encoder-type displacement meter 211 and a vertical distance between the encoder-type displacement meter 211 and an anchor 213 to obtain a deformation displacement-time relationship of the underwater monitoring point.

S3: Monitor a water temperature-time relationship and a wave height-time relationship 3 in a reservoir region via a water temperature sensor 28 and a gravity wave gauge 29 in real time respectively, and obtain a reservoir water level-time relationship of the landslide via the GPS sensor 26.

S4: Monitor a deformation displacement, water temperature, a water level, and a wave height on the water surface 3 of the underwater monitoring point, to monitor a deformation and fracture process of an underwater side slope in real time.

According to the technical solutions provided in the present disclosure, the buoy-type monitor 2 monitors real-time 3D coordinates of the underwater monitoring point, to precisely determine a coordinate change of underwater 3D space of the landslide mass for landslide monitoring and warning, optimization of a landslide prediction algorithm, and the like. In addition, relevant environmental factors (such as a change of the reservoir water level, a surge, and a water temperature) can be recorded in real time, and real-time information collection, storage, processing, analysis, and transmission functions are integrated. The solar energy—based power generation and energy storage apparatus supplies power automatically and intelligently.

In this specification, the terms "front", "back", "upper", and "lower" are defined based on positions of the components or parts in the figures and relative positions of the components or parts, to merely express the technical solutions clearly and conveniently. It should be understood that these terms are not used to limit the protection scope of the present disclosure.

The embodiments in the present disclosure and the features in the embodiments may be combined with each other in a non-conflicting situation.

The above-mentioned are merely preferred embodiments of the present disclosure, and are not intended to limit the present disclosure. Any modifications, equivalent replacements and improvements made within the spirit and principle of the present disclosure should be included in the protection scope of the present disclosure.

What is claimed is:

1. An apparatus for monitoring deformation of a reservoir landslide under water of a reservoir, comprising at least one buoy-type monitor, wherein the buoy-type monitor comprises a floating shell, a data monitoring system, and an anchor securing the floating shell from drifting around, the floating shell and the data monitoring system and the anchor are fixedly connected, the floating shell is hollowed-out for floating on a water surface, and the data monitoring system comprises a pull cord, a displacement compensation mechanism, and a global positioning system (GPS) sensor, a water temperature sensor, a gravity wave gauge, an encoder-type displacement meter, and an integrated circuit that are secured in the floating shell;

the GPS sensor is configured to transmit and receive a GPS signal to obtain a real-time position of the floating shell, the water temperature sensor is located below the water surface to monitor a change of water temperature in real time and obtain a water temperature-time relationship, and the gravity wave gauge is operable to obtain, after the floating shell floats with a wave, wave height information calculated by a built-in accelerometer, to obtain a wave height-time relationship;

an upper end of the pull cord is securely connected to the floating shell via the displacement compensation mechanism, and a lower end of the pull cord is securely connected to the anchor, the displacement compensation mechanism is configured to compensate for a displacement after the floating shell floats with the wave, so that the pull cord is constantly kept in a tensioned state, and the encoder-type displacement meter is located below the GPS sensor, and configured to measure a real-time distance between the encoder-type displacement meter and the anchor; and the integrated circuit is electrically connected to the GPS sensor, the water temperature sensor, the gravity wave gauge, and the encoder-type displacement meter, and configured to collect, process, and transmit monitoring data.

2. The apparatus according to claim 1, wherein the displacement compensation mechanism comprises a winding hub and a shrinking spring; the winding hub extends horizontally and can be axially and rotatably installed below the GPS sensor in the floating shell; the shrinking spring is disposed in a periphery of the winding hub, an inner end of the shrinking spring is securely connected to the winding hub, and an outer end of the shrinking spring is securely connected to the floating shell; and the upper end of the pull cord runs through the floating shell and is wound on the winding hub.

3. The apparatus according to claim 2, wherein the encoder-type displacement meter comprises a magnetic inductive read head and a permanent magnetic encoding disk, the permanent magnetic encoding disk is coaxially secured on the winding hub, the winding hub rotates to drive the permanent magnetic encoding disk to rotate, the magnetic inductive read head is located above the permanent magnetic encoding disk, a side surface at which the magnetic inductive read head is installed is in a same plane as or parallel with a side surface of the permanent magnetic encoding disk, and the magnetic inductive read head is configured to obtain a rotation distance of the permanent magnetic encoding disk, to obtain a retracted or released length of the pull cord.

4. A system that includes the apparatus according to claim 1, further comprising a ground data base station, wherein a data transceiver device is arranged within the floating shell, and located above the water surface, and is electrically connected to the integrated circuit to obtain the monitoring data, wherein the data transceiver device is in communication connection with the ground data base station to transmit the monitoring data to the ground data base station, and the ground data base station uploads the collected monitoring data to a network.

5. The system according to claim 4, wherein the ground data base station is provided with a solar panel.

6. The apparatus according to claim 1, wherein the floating shell is made of a lightweight and high-strength material.

7. The apparatus according to claim 1, wherein the floating shell is in a water drop shape.

8. The apparatus according to claim 1, further comprising a storage battery, wherein the storage battery is secured in the floating shell to supply power to components in the buoy-type monitor.

9. The apparatus according to claim 8, further comprising a solar panel, wherein the solar panel is secured in the floating shell and located above the GPS sensor, a cover part of the floating shell corresponding to the solar panel are transparent, and the storage battery is electrically connected to the solar panel.

10. A monitoring method for monitoring deformation of a reservoir landslide by using the apparatus according to claim 1, the monitoring method comprising the following steps:

S1: determining a specific distribution range of an underwater part of a landslide mass of a reservoir landslide based on previous exploration, determining a position of the underwater monitoring point, and disposing the apparatus at the underwater monitoring point;

S2: determining real-time three-dimensional (3D) coordinate information of the floating shell via the GPS sensor, obtaining an extension length of the pull cord via the encoder-type displacement meter, and obtaining real-time 3D coordinate information of the underwater monitoring point based on a vertical distance between the GPS sensor and the encoder-type displacement meter and a vertical distance between the encoder-type displacement meter and the anchor to obtain a deformation displacement-time relationship of the underwater monitoring point;

S3: monitoring a water temperature-time relationship and a wave height-time relationship in a reservoir region via the water temperature sensor and the gravity wave gauge in real time respectively, and obtaining a reservoir water level-time relationship of the landslide via the GPS sensor; and S4: monitoring a deformation displacement, a water temperature, a water level, and a wave height of the underwater monitoring point, to monitor a deformation and fracture process of an underwater side slope in real time.

\* \* \* \* \*